US011939405B2

(12) United States Patent
Silbermann et al.

(10) Patent No.: US 11,939,405 B2
(45) Date of Patent: Mar. 26, 2024

(54) METHOD OF PULPING COTTON-BASED RAW MATERIAL

(71) Applicant: LENZING AKTIENGESELLSCHAFT, Lenzing (AT)

(72) Inventors: Stephan Silbermann, Gampern (AT); Christian Weilach, Vöcklabruck (AT)

(73) Assignee: Lenzing AG, Lenzing (AT)

( * ) Notice: Subject to any disclaimer, the term of this patent is extended or adjusted under 35 U.S.C. 154(b) by 909 days.

(21) Appl. No.: 16/472,482

(22) PCT Filed: Dec. 22, 2017

(86) PCT No.: PCT/EP2017/084357
§ 371 (c)(1),
(2) Date: Jun. 21, 2019

(87) PCT Pub. No.: WO2018/115428
PCT Pub. Date: Jun. 28, 2018

(65) Prior Publication Data
US 2021/0130501 A1 May 6, 2021

(30) Foreign Application Priority Data

Dec. 22, 2016 (EP) ..................... 16206392

(51) Int. Cl.
| C08B 16/00 | (2006.01) |
| C08B 9/00 | (2006.01) |
| C08K 3/30 | (2006.01) |
| C08K 5/17 | (2006.01) |
| D01F 2/00 | (2006.01) |
| D01F 2/06 | (2006.01) |

(52) U.S. Cl.
CPC ............... *C08B 16/00* (2013.01); *C08B 9/00* (2013.01); *C08K 3/30* (2013.01); *C08K 5/175* (2013.01); *D01F 2/00* (2013.01); *D01F 2/06* (2013.01); *C08K 2003/3063* (2013.01)

(58) Field of Classification Search
CPC ........... C08B 16/00; C08B 9/00; D21C 3/026; D21C 3/028; D21C 3/00; D21C 5/00; D01F 2/00; D01F 2/06; C08K 3/30; C08K 5/175; C08K 2003/3063
See application file for complete search history.

(56) References Cited

U.S. PATENT DOCUMENTS

| 2,673,148 A | 3/1954 | Harris |
| 2,686,120 A | 8/1954 | Marshall et al. |
| 3,632,469 A | 1/1972 | Wilder |
| 3,900,334 A * | 8/1975 | Brink ................ C08H 8/00 106/164.5 |
| 4,087,316 A | 5/1978 | Jividen et al. |
| 5,322,647 A | 6/1994 | Reiche et al. |
| 6,174,412 B1 | 1/2001 | Paterson-Brown et al. |
| 7,351,764 B2 | 4/2008 | Shevchenko et al. |
| 2005/0217813 A1 | 10/2005 | Shevchenko et al. |
| 2011/0061825 A1 | 3/2011 | Li et al. |
| 2013/0296545 A1 | 11/2013 | Sixta et al. |
| 2016/0237619 A1 | 8/2016 | Weilach et al. |

FOREIGN PATENT DOCUMENTS

| CN | 101484632 A | 7/2009 | |
| CN | 101413146 B | 9/2010 | |
| CN | 105765116 A | 7/2016 | |
| JP | 49-93601 A | 9/1974 | |
| JP | S6112991 A | 1/1986 | |
| JP | 2007-530818 A | 11/2007 | |
| KR | 10-0480871 B1 | 4/2005 | |
| WO | 2004/085735 A1 | 10/2004 | |
| WO | WO-2009015555 A1 * | 2/2009 | ............... D21C 5/00 |
| WO | WO-2013033386 A1 * | 3/2013 | ............ D21C 3/003 |
| WO | 2013/124265 A1 | 8/2013 | |

OTHER PUBLICATIONS

Machine translation of JP S6112991 A originally published Jan. 1986 to Hideho et al. (Year: 1986).*
Machine translation of WO 2009015555 A1 originally published Feb. 2009 to Bi et al. (Year: 2009).*
Milanovic et al., Structure and Properties of Tempo-Oxidized Cotton Fibers, 2012, CI&CEQ 18 (3), 473-481 (Year: 2012).*
J. Röhrling, et al., "A Novel Method for the Determination of Carbonyl Groups in Cellulosics by Fluorescence Labeling. 1. Method Development", Biomacromolecules, 3, pp. 959-968 (2002).
J. Röhrling, et al., "A Novel Method for the Determination of Carbonyl Groups in Cellulosics by Fluorescence Labeling. 2. Validation and Applications", Biomacromolecules, 3, pp. 969-975 (2002).
A. Potthast, et al., "A Novel Method for the Determination of Carbonyl Groups in Cellulosics by Fluorescence Labeling. 3. Monitoring Oxidative Processes", Biomacromolecules, 4, pp. 743-749 (2003).
R. Bohrn, et al., "The FDAM Method: Determination of Carboxyl Profiles in Cellulosic Materials by Combining Group-Selective Fluorescence Labeling with GPC", Biomacromolecules, 7, pp. 1743-1750 (2006).

(Continued)

*Primary Examiner* — Coris Fung
*Assistant Examiner* — Ritu S Shirali
(74) *Attorney, Agent, or Firm* — Venable LLP

(57) ABSTRACT

The present invention relates to a method of pulping cotton-based raw material for producing dissolving pulp. More specifically, the invention relates to a process for producing dissolving pulp under alkaline conditions in combination with a gaseous oxidizing agent. The present invention further relates to dissolving pulp obtainable by pulping cotton-based raw material, in particular dissolving pulp obtainable by the method of the present invention, the use of such dissolving pulp for producing regenerated cellulose molded bodies, and methods of producing lyocell or viscose including such dissolving pulp.

14 Claims, No Drawings

(56) References Cited

OTHER PUBLICATIONS

Office Action issued in counterpart Korean Application No. 10-2019-7020870, dated Jul. 21, 2020 (10 pages).
Schelosky et al., "Molmassenverteilung cellulosischer Produkte mittels Größenausschlußchromatographie in DMAc/LiCl," Das Papier, Dec. 1999, pp. 728-738.
Hüpfl et al., "Prüfung von Chemiefaserzellstoffen an einer Viskose-Kleinstanlage," Das Papier, vol. 20, No. 3, pp. 125-132 (1966).

* cited by examiner

METHOD OF PULPING COTTON-BASED RAW MATERIAL

The present application is a national-stage entry under 35 U.S.C. § 371 of International Patent Application No. PCT/EP2017/084357, published as WO 2018/115428 A1, filed Dec. 22, 2017, which claims priority to European Patent Application No. 16206392.9, filed Dec. 22, 2016, the entire disclosure of each of which is incorporated by reference herein.

BACKGROUND OF THE INVENTION

Field of the Invention

The present invention relates to a method of pulping cotton-based raw material for producing dissolving pulp. More specifically, the invention relates to a process for producing dissolving pulp under alkaline conditions in combination with a gaseous oxidizing agent. The present invention further relates to dissolving pulp obtainable by pulping cotton-based raw material, in particular dissolving pulp obtainable by the method of the present invention, the use of such dissolving pulp for producing regenerated cellulose molded bodies, and methods of producing lyocell or viscose including such dissolving pulp.

Background of the Invention

Dissolving pulp, which is essentially pure cellulose, is an important starting material in the chemical industry for various purposes. Dissolving pulp is, for example, used in the production of regenerated cellulose molded bodies and as a raw material for the chemical derivatization of cellulose. Regenerated cellulose molded bodies are three-dimensional or two-dimensional objects made from dissolving pulp, such as films and fibers. Typical regenerated cellulose molded bodies made from dissolving pulp are viscose, modal and lyocell. Typical examples of chemical derivatized cellulose are methylcellulose, cellulose triacetate, nitrocellulose, carboxymethylcellulose, and ethylcellulose. Methylcellulose is typically used as a thickener or emulsifier, cellulose triacetate is used to produce films and fibers.

Dissolving pulp is characterized by its high chemical purity and low content of hemicellulose, which is required for the above indicated downstream uses. Dissolving pulp is largely made from pulpwood, i.e. timber that is grown for the purpose of producing pulp, through the so-called sulfite process or the so-called kraft process. Only a minor fraction of dissolving pulp is made from cotton-based raw material, an alternative source of cellulose.

Dissolving pulp made from pulpwood is associated with intrinsic limitations and disadvantages. For example, the process of producing dissolving pulp from pulpwood is rather inefficient, since large portions of pulpwood are made up of hemicellulose and lignin, components that have to be removed in the process of preparing dissolving pulp. Furthermore, deforestation and illegal logging are major concerns associated with producing dissolving pulp from pulpwood. Pulpwood may be grown in a responsible and sustainable way, however, if this is ignored, ecological, social and climatic consequences can be dramatic. On the other hand, the global market for dissolving pulp has been growing rapidly. Alternative cellulose sources for the production of dissolving pulp are therefore needed to satisfy increasing demands for dissolving pulp.

To date industrial production of dissolving pulp from cotton-based raw material is essentially restricted to the use of cotton linters as raw material. For producing dissolving pulp, cotton linters are treated under harsh conditions in order to remove impurities such as e.g. seed hull or cotton stalk residues and decrease the high degree of polymerization (DP) of cotton fibers. Therefore, in the pulping of cotton linters, high reaction temperatures above 150° C. are commonly applied in combination with an extensive use of process chemicals. Due to the required high reaction temperatures cellulose degradation reactions occur and lead to a substantial loss of yield, causing a pricing pressure on the product. In addition to the actual pulping process, multi stage bleaching processes are required to achieve the brightness levels required in order to allow the use of cotton linters pulp for dissolving pulp applications. Said multi stage bleaching processes typically entail the use of environmentally harmful chemicals (e.g. $Cl_2$, $ClO_2$, $H_2O_2$, NaClO).

Furthermore, dissolving pulp generated by the methods known in the art from cotton linters pulp is generally less reactive in the production of molds of regenerated cellulose, via e.g. the viscose or lyocell process, than conventional wood-based dissolving pulp. The use of cotton linters pulp is therefore typically limited to specialty applications, such as the production of cellulose derivatives (acetate, ethers). Cotton lint fibers are hitherto not processed to dissolving pulp on an industrial scale.

Therefore, there is a need for the development of improved methods for the production of dissolving pulp from cellulose sources other than pulpwood. In particular, there is a need to improve existing processes for the production of dissolving pulp from cotton linters and to provide additional methods for the production of dissolving pulp from other cotton-based raw materials, which provide a sustainable source for cellulose and an alternative to the use of pulpwood.

The dissolving pulp generated from cotton-based raw material typically has to meet certain quality requirements in order to be useful as a raw material for downstream applications, in particular for the production of regenerated cellulose molded bodies. For example, the generated dissolving pulp should be of high purity, that is, it should be essentially free of unwanted contaminants such as lignin, waxes, oils, dyes, polyaromatic and heteroaromatic compounds and it should have a low content of hemicellulose. Further, for some downstream applications, the dissolving pulp ideally has a high level of brightness, a uniform molecular weight distribution (MWD) and a defined viscosity within a certain range, which are characteristics that are particularly desirable, for instance, for use in the production of textiles. All these factors may influence the reactivity of dissolving pulp in downstream applications, such as the viscose, modal or lyocell processes.

The prior art discloses various methods of pulping cotton-based raw material. For example, U.S. Pat. No. 6,174,412 B1 describes cotton linter tissue products and a method for preparing same. U.S. Pat. No. 4,087,316 describes a process for obtaining cotton seed hull commodities including cellulosic fibers and xylitol. WO2013/124265 A1 describes a method for the regeneration of cellulose-containing materials. U.S. Pat. No. 2,673,148 describes a method for alkaline pulping using gaseous oxygen. U.S. Pat. No. 2,686,120 describes a method for alkaline pulping of lignocellulose in the presence of oxygen to produce pulp, vanillin and other oxidation products of lignin substance.

The prior art also discloses the bleaching of various materials, such as cotton-based raw materials, with oxygen.

For example, US2011/0061825 A1 describes grass-type unbleached paper products and a production method thereof. WO2004/085735 A1 describes methods for bleaching cellulosic materials like textiles and recycled fibers using standard bleaching conditions (peroxide, oxygen and ozone bleaching) in the presence of a substituted guanidine-based additive. U.S. Pat. No. 5,322,647 describes a method for oxygen bleaching of cotton linters by disproportionation of hydrogen peroxide.

The prior art does not disclose a method which allows the effective and controlled conversion of a wide range of cotton-based raw materials into dissolving pulp, wherein the dissolving pulp is suitable for downstream applications such as those indicated above, e.g. the production of regenerated cellulose molded bodies. The methods of the prior art all suffer from the disadvantages that they are limited with regard to the chosen starting material, they are not sufficiently adjustable with regard to the desired end product, for example, they do not allow tight control of the intrinsic viscosity of the resulting dissolving pulp, and they do not provide a pulp that satisfies the above indicated needs, in particular a dissolving pulp that can be used to produce regenerated cellulose molded bodies.

The present invention addresses these needs and provides further advantages over the prior art, which are presented in more detail below.

BRIEF DESCRIPTION OF THE INVENTION

One aspect of the invention provides a method of pulping a cotton-based raw material for producing dissolving pulp, said method comprising the steps of: incubating the cotton-based raw material with an alkaline solution in combination with a gaseous oxidizing agent in a pressurized vessel i) at a temperature of about 90-about 185° C., ii) for an incubation time of about 45-about 270 minutes, iii) in the presence of a cellulose-stabilizing additive, iv) at a concentration of alkali of about 1-about 35% (w/w) of the cotton-based raw material, and v) at an initial gas pressure of about 1-about 21 bar (about 0.1 MPa-about 2.1 MPa), and washing the generated dissolving pulp.

In one embodiment the alkaline solution is a solution of potassium hydroxide, sodium hydroxide, sodium carbonate or a combination thereof, preferably sodium hydroxide. In a further embodiment the gaseous oxidizing agent is oxygen ($O_2$) or comprises oxygen. In a further embodiment the cellulose-stabilizing additive is a magnesium salt, preferably magnesium sulfate. In a further embodiment of the invention the cellulose-stabilizing additive is a transition metal chelator, preferably EDTA, DTPA, NTA, DTPMPA or any combination thereof. In a further embodiment the concentration of the cellulose-stabilizing additive is about 0.01-about 5.00% (w/w) of the cotton-based raw material. In a further embodiment the step of incubating the cotton-based raw material with the alkaline solution is preceded by a step of mechanically disintegrating the cotton-based raw material. In a further embodiment the cotton-based raw material is a pre-or post-consumer material. In a further embodiment, including particularly preferred parameters, the temperature is about 100-about 150° C., the incubation time is about 90-about 150 minutes, the concentration of alkali is about 4-about 20% (w/w) of the cotton-based raw material, the initial gas pressure is about 2-about 10 bar (about 0.2 MPa-about 1.0 MPa), the concentration of the cellulose-stabilizing additive is about 0.05-about 2.00% (w/w) of the cotton-based raw material, or any combination thereof, including the combination of all thereof. In a further embodiment, the concentration of alkali in the alkaline solution is sufficient to obtain a pH of at least about pH 9.

The method of pulping a cotton-based raw material of the present invention provides high quality dissolving pulp, which is suitable for use in the production of regenerated cellulose molded bodies, such as any one or more of lyocell, modal or viscose. The method of pulping of the present invention uses mild process conditions and is therefore environmentally benign, since it, for example, does not necessitate the use of harmful bleaching chemicals, and has low energy consumption. Furthermore, it allows tuning the pulping process to achieve a desired dissolving pulp product with specific properties, such as a specific viscosity, in essentially a single-step reaction.

A further aspect of the present invention provides dissolving pulp obtainable by pulping cotton-based raw material, said dissolving pulp being essentially free of carbonyl groups, carboxyl groups or carbonyl groups and carboxyl groups. In one embodiment the dissolving pulp is obtainable by the method of pulping a cotton-based raw material described above or elsewhere in the present application. In a further embodiment the dissolving pulp has an intrinsic viscosity of about 200-about 1500 mL/g, an ISO brightness of at least about 80%, preferably at least about 85%, a viscose filter value (FV) of at least about 200, preferably at least about 300, or any combination thereof, including the combination of all thereof. The chemical reactivity of carbonyl groups, carboxyl groups or both can render the cellulose which is present in dissolving pulp, and which comprises such group(s), susceptible to undesirable degradation reactions which tend to reduce the intrinsic viscosity of such dissolving pulp in an uncontrolled manner. Dissolving pulp, for example the dissolving pulp obtainable by any of the inventive methods described herein, which is essentially free of carbonyl groups, carboxyl groups or carbonyl groups and carboxyl groups, is therefore advantageously more resistant to chemical degradation, with the result that its intrinsic viscosity is advantageously placed more tightly under experimental control.

A further aspect of the present invention provides a use of the dissolving pulp described above or elsewhere in the present application (the dissolving pulp of the present invention) for producing regenerated cellulose molded bodies. In a preferred embodiment the regenerated cellulose molded body is any one or more of lyocell, modal or viscose. The present invention is however not limited to the use of the dissolving pulp of the present invention for producing lyocell, modal or viscose. The dissolving pulp of the present invention may be used for the production of, or producing, any form of regenerated cellulose molded bodies known to the skilled person.

A further aspect of the present invention provides a method of producing lyocell comprising using the dissolving pulp of the present invention as a starting material. This aspect pertains to the established lyocell process known to the skilled person. In this aspect the dissolving pulp of the present invention is used as a starting material in the lyocell process. This is possible because the dissolving pulp of the present invention is particularly suited for the production of regenerated cellulose molded bodies, in particular through the lyocell process, that is, the dissolving pulp of the present invention has certain characteristics, described elsewhere in this application, that render the dissolving pulp of the present invention amenable to the lyocell process.

A further aspect of the present invention provides a method of producing viscose comprising using the dissolving pulp of the present invention as a starting material. This aspect pertains to the established viscose process known to the skilled person. As described above, in the context of the lyocell process, the dissolving pulp of the present invention is particularly suited for use in the viscose process, since the dissolving pulp of the present invention fulfills all characteristics necessary to be used in the viscose process. These characteristics are described elsewhere in this application.

A further aspect of the present invention provides a method of producing modal comprising using the dissolving pulp of the present invention as a starting material. This aspect pertains to the established modal process known to the skilled person. As described for viscose and lyocell, the dissolving pulp of the present invention is particularly suited for the production of modal, due to its characteristics that are described elsewhere in this application.

A further aspect of the present invention provides a regenerated cellulose molded body that is obtainable from the dissolving pulp of the present invention, in particular dissolving pulp that is produced by the method of pulping of the present invention. In some embodiments of the present invention the regenerated cellulose molded body is any one or more of lyocell, viscose or modal. A regenerated cellulose molded body that is obtainable from the dissolving pulp of the present invention means that the dissolving pulp of the present invention is used as a starting material in the process of producing the regenerated cellulose molded body, in particular the lyocell process, the viscose process or the modal process.

The above embodiments are particularly preferred embodiments of the present invention. The above embodiments relate to particularly preferred modes of carrying out the method of pulping a cotton-based raw material according to the present invention, particularly preferred embodiments of the dissolving pulp of the present invention, preferred uses of the dissolving pulp of the present invention and methods of producing regenerated cellulose molded bodies, such as any one or more of lyocell, viscose or modal. It is emphasized that any combination of the above embodiments, or respective technical features therein, is also disclosed herein as part of the present invention. The skilled person understands that the present invention is not limited to the embodiments explicitly recited above, but also includes combinations not explicitly disclosed above or below.

Such combinations result, for example, from combining aspects, embodiments or features of the present invention mentioned above with aspects, embodiments or features of the present invention disclosed below in the detailed description of the present invention. The skilled person will appreciate that, in fact, the above described embodiments are to be considered together with the corresponding sections of the detailed description given further below, as well as with the examples set out in this application.

Other aspects, embodiments, features, and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

As used herein, the term "initial gas pressure" refers to the pressure inside the pressurized vessel (digester) at ambient temperature, for example standard room temperature of 25° C., following closing thereof, subsequent to introducing the initial charge of gaseous oxidizing agent and cotton-based raw material, and at the very beginning of the incubation before heat is applied to raise the temperature to about 90 to about 185° C. For example, if the gaseous oxidizing agent is introduced into the digester at a pressure 8 bar (0.8 MPa) and the digester was previously at atmospheric pressure, then the initial gas pressure in the digester will be about 9 bar (0.9 MPa), at sea level. The skilled person also understands the direct relationship between temperature and pressure and will therefore readily adjust the initial gas pressure to a target value within the specified inventive range factoring in the known prevailing ambient temperature.

As used herein, the term "reactivity" of dissolving pulp, or cellulose, refers to the capacity of dissolving pulp, or cellulose, to participate in a given reaction or process. For example, with respect to the lyocell, modal or viscose process, the term "reactivity" describes the ability of dissolving pulp, or cellulose, to participate in, e.g. function as the starting material of, the lyocell or viscose process. The higher the reactivity, in this case, the more suitable the dissolving pulp, or cellulose, is for the lyocell or viscose process.

As used herein, the term "cotton-based raw material" is meant to encompass any material which contains or consists of cellulose that is derived from a cotton plant, or which contains or consists of cellulose that has been originally synthesized by a cotton plant.

The terms "cotton-based raw material" and "cotton-based raw materials" are used interchangeably. The term "cotton-based raw material" may include more than one type of cotton-based raw material, for instance, it may include one, two, three or more different types of cotton-based raw materials. In particular, the term refers to materials containing or consisting of cellulose that is derived from cotton lint or cotton linters. Further, the term "cotton-based raw material" also encompasses any cellulose containing parts of the cotton plant, for example cotton linters. In particular, the term "cotton-based raw material" encompasses any material that contains cellulose derived from the cotton plant in combination with other components, so-called blends, such as artificial, synthetic or other natural fibers, for example, nylon, polyester, acrylic, lyocell, modal, viscose, wool, or flax, just to name a few. The term "cotton-based raw material" in particular encompasses post-consumer fabrics, such as for example old garments or non-garment cloth comprising or consisting of cellulose that is derived from a cotton plant, or which contains or consists of cellulose that has been originally synthesized by a cotton plant. In some embodiments of the present invention the cotton-based raw material does not comprise cotton linters.

As used herein, the term "cellulose stabilizing additive" refers to substances or compounds that prevent the unwanted chemical degradation of cellulose. These substances may either interact directly with the cellulose molecule to exert a protective effect or protect cellulose from chemical degradation by interacting with other components. Such cellulose stabilizing additives may be a magnesium salt, preferably magnesium sulfate. While not being bound by theory it is believed that magnesium salts stabilize cellulose during the method of pulping by directly binding to the cellulose molecule and thereby preventing degradation reactions, in particular, the cellulose peeling reaction. The cellulose stabilizing additive of the invention may also be a complexing agent, chelator, scavenger or binding agent such as, but not limited to EDTA, DTPA, DTPMPA or NTA that complexes, chelates, scavenges or binds metals, for instance, transition metals. While not being bound by theory it is believed that transition metals catalyze the production of highly reactive oxygen radicals, which cause cellulose degradation. Therefore, sequestering transition metals by addition of a complexing agent, chelator, scavenger or binding agent stabilizes cellulose during the method of pulping. In some embodiments of the present invention the cellulose stabilizing additive does not comprise sodium percarbonate, polysulfide, sodium dithionite and/or anionic surfactant. Preferably, the stabilizing additive does not comprise any one of sodium percarbonate, polysulfide, sodium dithionite and anionic surfactant, in particular not in an amount of 20-30%, 20-30%, 25-35% and 5-10%, by weight relative to the total amount of cellulose stabilizing additive, respectively. Preferably, the anionic surfactant that is not comprised in the cellulose stabilizing additive is alkyl benzene sulfonate.

As used herein, the term "pre- or post-consumer material" refers to a specific subset of cotton-based raw material. Pre- or post-consumer material of the cotton-based raw material has been processed industrially, technically or manually. It therefore excludes natural raw material, such as cotton linters or cotton lint. "Pre-consumer material" in the sense of the present invention is industrially, technically or manually processed cotton-based raw material that has not yet been sold to, or that has not yet reached, the end consumer or user. Pre-consumer material includes, for example, bulk material, for example bulk textiles or bulk non-wovens, destined for further industrial processing, or waste products derived from industrial processes. "Post-consumer material" in the sense of the present invention refers to materials that have been sold or that have reached the end consumer user. Typical post-consumer materials are textiles or non-wovens. Post-consumer material thus relates to so-called secondhand material or used goods, particular secondhand textiles or nonwovens, for example, secondhand or old clothing or other second hand or old cloth material.

As used herein, the term "about" when referring to a measurable value such as an amount, a temporal duration, and the like, is meant to encompass, in addition to that measurable value itself, variations of ±20% or ±10%, in some instances ±9%, ±8%, ±7%, ±6%, ±5%, ±4%, ±-3, ±2% or ±1%, and in some instances ±0.9%, ±0.8%, ±0.7%, ±0.6%, ±0.5%, ±0.4%, ±0.3%, ±0.2% or ±0.1% from the specified value. It is to be understood that the term "about", in reference to a particular value, includes that exact particular value itself, irrespective of any explicit mention that that exact particular value is included. Thus, the absence of an explicit indication that the term "about" includes the particular exact recited value is not to be understood that the particular recited value is excluded from the range of variations created by the term "about"; even in the absence of an explicit indication that the term "about" includes the particular exact recited value, that exact particular value is still included in said range of variations created by the term "about". The skilled person will recognize when deviations around a stated value may be either fractional (as for example for a temperature, pressure or duration), and when such deviations may only be integral (as for example for discrete moieties within a larger molecule). In addition to the above general definition of the term "about", this term may in particular refer to ±0.1 pH units relative to a stated pH value, ±1° C. relative to a stated temperature value, ±0.5 bar relative to a stated pressure value, ±1% (w/w) relative to a stated concentration, ±1, ±2, ±3, ±4, or ±5 mL/g relative to a stated intrinsic viscosity, ±0.1, ±0.2, ±0.3, ±0.4, or ±0.5 relative to a stated ISO brightness, ±5, ±10, ±15, ±20, or ±25 relative to a stated viscose filter value (FV), or any combination thereof. If the term "about" is recited before a numerical range, the term "about" may refer to the lower endpoint, the upper endpoint or both the lower endpoint and the upper endpoint. For example, if it is stated that a preferred intrinsic viscosity of the present invention is about 200-1500 mL/g, the range encompasses the lower endpoint of 200 as well as the upper endpoint of 1500 mL/g.

As used herein, the term "pulping" or "method of pulping" refers to a process during which a material, such as cotton-based raw material, is treated in a way that releases cellulose from the material. Thus, in the process of pulping, the original material added to the process is degraded over the course of the process to yield cellulose.

As used herein, the term "dissolving pulp", also known as dissolving cellulose, or chemical pulp, refers to extracted cellulose of high purity. Dissolving pulp in the sense of the present invention is characterized by high chemical purity, in particular, a low content of hemicellulose, a high content of cellulose, a high level of brightness and a narrow MWD. Cellulose in the form of dissolving pulp can be brought into solution and spun into fibers, for example through the viscose or lyocell process, or it can be chemically derivatized. Dissolving pulp is different from mechanical pulp or thermomechanical pulp. Mechanical pulp or thermomechanical pulp refers to a material comprising cellulose, wherein the material has a lower purity than dissolving pulp extracted by means different than those according to the present invention. Such methods of the art are for example used in the production of paper, and are not suitable for the production of regenerated cellulose molded bodies.

As used herein, the term "essentially free" refers to an amount that is about at the detection limit for a given analyte. In particular, the term "essentially free" in the context of essentially free of carbonyl groups or essentially free of carboxyl groups means about at the detection limit for carbonyl groups or about at the detection limit for carboxyl groups, respectively. The detection limit for carbonyl groups using the CCOA method (described hereinbelow) may be about 0.50, about 0.40, about 0.30, or about 0.20 µmol/g (µmol carbonyl groups per gram dissolving pulp). The detection limit for carboxyl groups using the FDAM (described herein below) method may be about 4.00, about 3.50 or about 3.00 µmol/g (µmol carboxyl groups per gram dissolving pulp).

As used herein, the terms "carbonyl" or "carbonyl group" are used interchangeably and refer to a non-terminal carbonyl group (—C(O)—), wherein the carbonyl group is bound to two carbon atoms (C—C(O)—C), i.e., a ketone or ketone group.

As used herein, the terms "carboxyl" or "carboxyl group" are used interchangeably and refer to a chemical functional group of the structure—COOH. The terms "carboxyl" or "carboxyl group" may refer to the protonated form —COOH, that is the free acid form, as well as the deprotonated anionic form —COO, i.e., the carboxylate anion, which carries a single negative charge. Further the terms "carboxyl" or "carboxyl group" may also refer to ester forms of the structure —COOR, wherein the R stands for a carbon-containing substituent, and wherein the non-carbonyl oxygen is bound to two carbon atoms.

As used herein, the term "comprising" has the broad standard meaning "including", "encompassing", or "containing". It includes the explicitly recited elements, and also allows the presence of other elements not recited. In addition to this broad encompassing meaning, as used herein, the term "comprising" may also have the limiting meaning "consisting of". This means that any aspect or embodiment of the present application that is defined as comprising certain features, also includes the meaning of merely consisting of said features, whether this is explicitly stated or not. In addition, the term "comprising" may also have the meaning "consisting essentially of".

As used herein, the term "regenerated cellulose molded body" refers to a two- or three-dimensional object that consists of or comprises cellulose and has been produced from dissolving pulp. Typical regenerated cellulose molded bodies are fibers, films or filaments made of any one or more of lyocell, viscose or modal.

Any aspect, embodiment or feature of the invention described hereinabove or hereinbelow may be freely combined with any other aspect, embodiment or feature of the invention described hereinabove or hereinbelow. This applies regardless of whether the possibility of such combination is explicitly stated hereinabove or hereinbelow.

Method of Pulping

The method of pulping a cotton-based raw material for producing dissolving pulp according to the present invention, said method comprising the steps as indicated above (see "Brief description of the invention") or below, provides a high quality dissolving pulp that is suitable for downstream applications, for example for use in the production of regenerated cellulose molded bodies, such as any one or more of lyocell, viscose or modal. The method of pulping of the present invention includes a step in which alkaline reaction conditions are combined with a gaseous oxidizing agent, preferably oxygen ($O_2$). The combination of alkaline reaction conditions, in the form of an alkaline solution, with a gaseous oxidizing agent allows the production of high quality dissolving pulp with a particularly high ISO brightness, for example, an ISO brightness of more than 90%, in a single concerted method without the necessity of additional bleaching steps, such as applied by the pulping processes of the prior art. This allows the inventive method of pulping to be performed in a single cooking step, in addition to the washing step. In addition to the efficiency gained by such concerted performance the method of pulping of the present invention also requires no environmentally harmful bleaching chemicals. The inventive method thus provides a simpler and more coherent and concerted process flow, thereby, for example, reducing handling losses, ultimately lowering costs and increasing yields, while avoiding potentially harmful effects on the environment.

In some embodiments of the method of pulping of the present invention no sodium percarbonate, polysulfide, sodium dithionite and/or anionic surfactant is added. Preferably, the method of pulping of the present invention does not comprise addition of any one of sodium percarbonate, polysulfide, sodium dithionite and anionic surfactant, in particular not in an amount of 20-30%, 20-30%, 25-35% and 5-10%, by weight relative to the total amount of the mentioned components plus any added magnesium sulfate, respectively. Preferably, the anionic surfactant that is not added in the method of the present invention is alkyl benzene sulfonate.

The method of pulping of the present invention is carried out in such a way (described below) that the generated dissolving pulp is suitable for use in the production of regenerated cellulose molded bodies, such as any one or more of lyocell, viscose or modal. The specific characteristics of a dissolving pulp that is suitable for use in the production of regenerated cellulose molded bodies, such as any one or more of lyocell, viscose or modal, are described in detail in the present application, for example below in the section concerned with the dissolving pulp of the present invention. In particular, the individual parameters of the method of pulping of the present invention are chosen so as to ensure the production of high quality dissolving pulp with the desired properties as mentioned above. For instance, the temperature, incubation time, cellulose-stabilizing additive, concentration of alkali, and initial gas pressure, in addition to the pH value of the alkaline solution, and the cotton-based raw material used as starting material, are all chosen in such a way that the production of high quality dissolving pulp with the desired properties as mentioned above is ensured.

The method of pulping of the present invention may be carried out, at least partially, in a pressurized vessel (digester). At least the step of incubating the cotton-based raw material with an alkaline solution in combination with a gaseous oxidizing agent (the "cooking" step (a)) may be carried out in the digester. In some embodiments of the invention, even further steps may be carried out in the digester, for instance, one or more pre-treatment steps, or one or more washing steps. Prior to the cooking step, the alkaline solution is combined with the cotton-based raw material. The combination of the alkaline solution and the cotton-based raw material is herein referred to as "reaction mixture". The reaction mixture further contains a cellulose-stabilizing additive. The reaction mixture may contain additional components. All components of the reaction mixture, for instance the alkaline solution, the cotton-based raw material and the cellulose-stabilizing additive, are introduced into the digester, together or sequentially. In some embodiments, certain components of the reaction mixture may be added to the digester together, while other components are added separately, i.e., sequentially. For instance, the alkaline solution and the cotton-based raw material may be combined prior to introduction into the digester and then introduced into the digester together, while the cellulose-stabilizing additive may be added later.

In some embodiments of the invention the digester is charged with all solid and liquid components of the reaction mixture, for instance, the cotton-based raw material, the alkaline solution and the cellulose-stabilizing additive and then the gaseous oxidizing agent is added so as to obtain an initial gas pressure of about 1 to about 21 bar (about 0.1 to about 2.1 MPa).

In some embodiments of the present invention the digester is a batch reactor.

The digester of the present invention is sealed prior to the cooking step and heat is applied during the cooking step to raise the temperature above ambient temperature, to a temperature of about 90 to about 185° C. The skilled person will appreciate that the gas pressure in the digester will rise above the initial gas pressure as the temperature in the digester increases.

Typically the reaction mixture is removed from the digester prior to the washing step. To release pressure, the reaction mixture may be transferred to a blow tank. Typically, the reaction mixture is first cooled down to ambient temperature and the pressure is lowered to atmospheric pressure before the washing step. However, embodiments are also conceivable, depending on the construction of the digester, in which the washing step is performed in the digester. In such a scenario, the liquid phase of the reaction mixture may first be removed from the digester, retaining the insoluble, i.e. cellulose mixture components. Subsequently, washing of this retentate may be performed, possibly in multiple iterative wash/rinse phases in the same digester.

The washing step may include washing with water, for instance, deionized water, or organic solvents, such as an alcohol, in particular ethanol. Alternatively, or in addition, the washing step may include washing with an aqueous solution containing surfactants. In particular, the washing step may include washing with recovered organic or aqueous liquids of the pulping process, for example, water derived from one or more processing streams. Recovered organic or aqueous liquids may be obtained, for instance, from a pretreatment step or a drying step, following the washing step. Recovered organic or aqueous liquids, for example water that was separated from the dissolving pulp in a drying step following the washing step, may be directly used again in the washing step, or may be purified before being used again in the washing step. The washing step may also include washing with any mixture of any of the above mentioned liquids. The washing step serves the purpose of removing any contaminants that have been released from the cotton-based raw material during the cooking step, for instance, dyes, waxes, oils, polyaromatic and/or heteroaromatic compounds.

The method of pulping of the present invention uses cotton-based raw material as the starting material for the pulping process. Cotton-based raw material is any material that contains or consists of cellulose that is derived from a cotton plant, or cellulose that has been originally synthesized by a cotton plant. In particular, the term refers to materials containing or consisting of cellulose that is derived from cotton lint or cotton linters.

In some embodiments of the present invention the cotton-based raw material is a textile. Textiles are formed by weaving, knitting, crocheting, or knotting. Textiles which are cotton-based raw materials in the sense of the present invention consist of or contain cotton fibers. In addition to cotton fibers in the context of the present invention, the cotton-based raw material, e.g. textiles may contain additional synthetic fibers, for example, nylon, polyester, or acrylic. In further embodiments of the present invention the cotton-based raw material, e.g. textile may also contain regenerated cellulose molded bodies, such as any one or more of lyocell, viscose or modal. In some embodiments of the present invention the textile is a fabric or a cloth. In further embodiments of the present invention the textile may be pre-consumer textile waste, such as cuttings that are generated during tailoring.

In further embodiments of the present invention the textile may be a post-consumer textile, such as secondhand, old or discarded clothing, bedding or curtains. Exemplary forms of cotton-containing textiles that are contemplated in the context of the present invention as cotton-based raw material include denim, corduroy, chino, damask, drill, fleece, flannel, lace, raw denim, sateen, velour, twill, and velvet.

The cotton-based raw material of the present invention also includes non-wovens, which contain or consist of cotton. Non-wovens are neither woven, nor knitted, nor crocheted nor knotted. Non-wovens include sheet or web structures which are mechanically, thermally or chemically bonded together by entangling fibers or filaments. In some embodiments of the present invention non-wovens include felted materials, carpets, clothing, filters, containers, geotextiles, packaging material, and insulation material, to name just a few. In some embodiments of the present invention the non-woven may be a pre- or post-consumer non-woven. For instance, in some embodiments of the present invention the non-woven may be industrial non-woven waste. The cotton-based raw material of the present invention, and in particular the textiles or non-wovens of the present invention, may contain additional substances, such as zippers, buttons, knobs, or tags, that are removed during the method of pulping of the present invention. These additional substances can be removed, for instance, in a pretreatment step that precedes the cooking step.

In some embodiments the method of pulping of the present invention may include a pretreatment step, or multiple pretreatment steps. This pretreatment step, or these pretreatment steps, precedes the cooking step. In some embodiments of the present invention the pretreatment step, or the pretreatment steps, may include a step of mechanically disintegrating the cotton-based raw material, for instance, by milling, shredding, or cutting. Typically, this step, or these steps, is carried out before the cotton-based raw material is introduced into the pressurized vessel, in which the incubating step (cooking step) takes place. In some embodiments of the present invention the pretreatment step, or the pretreatment steps, includes the removal of additional substances from the cotton-based raw material, such as the removal of zippers, buttons, knobs, or tags.

The cooking step (i.e., step (a), which is the step of incubating the cotton-based raw material with an alkaline solution in combination with a gaseous oxidizing agent) of the inventive method of pulping is carried out at a temperature of about 80 to about 185° C., or between about 80 to about 185° C. Preferably, the cooking step is carried out at a temperature of about 90 to about 185° C., or between about 90 to about 185° C. In further embodiments of the invention, the temperature may be at least about 95° C., at least about 100° C., at least about 105° C., at least about 110° C., at least about 115° C., at least about 120° C., at least about 125° C., at least about 130° C., at least about 135° C., at least about 140°, or at least about 145° C., however, the temperature of the cooking step according to the present invention should not exceed about 185° C. Of course, any range that is defined by the above mentioned minimal temperatures and the maximal temperature of about 185° C. is also contemplated in the context of the present invention, either including or excluding the respective endpoints. For example, in further embodiments of the present invention the above mentioned temperature range is about 100 to about 185° C., or between about 100 to about 185° C. In some embodiments of the present invention the maximal temperature may be about 165° C., about 160° C., about 155° C., about 150°, or about 145° C. As with the maximal temperature of about 185° C., also these alternative maximal temperatures may be combined in the same way with any of the above mentioned minimal temperatures. For example, in some embodiments of the present invention the temperature of the cooking step is about 100 to about 160° C., or is between about 100 to about 160° C. Also contemplated in all of the above ranges are corresponding ranges in which the lower respective endpoint is included while the upper respective endpoint is excluded, as well as ranges in which the lower respective endpoint is excluded while the upper respective endpoint is included. The method of pulping of the present invention is carried out at a temperature that is suitable to produce a dissolving pulp that is itself suitable for being used in the production of regenerated cellulose molded bodies, such as any one or more of lyocell, viscose or modal. The specific characteristics of such a dissolving pulp are described in detail in the present application, for example below in the section concerned with the dissolving pulp of the present invention.

The cooking step of the method of pulping of the present invention is carried out for an incubation time of about 45 to about 270 minutes (min), or an incubation time between about 45 to about 270 min. In further embodiments of the present invention the incubation time of the cooking step is at least about 55 min, at least about 65 min, at least about 75 min, at least about 85 min, at least about 95 min, at least about 105 min, at least about 115 min, at least about 125 min, or at least about 135 min. The incubation time of the cooking step should not exceed about 270 min. Of course, any range that is defined by the above mentioned minimal incubation times and the maximal incubation time of about 270 min is also contemplated, either including or excluding the respective endpoints. For example, in some embodiments of the present invention the incubation time is about 115 to about 270 min, or between about 115 to about 270 min. In some embodiments of the present invention the maximal incubation time may be about 260 min, about 250 min, about 240 min, about 230 min, about 220 min, about 210 min, about 200 min, about 190 min, or about 180 min. Any range that results from a combination of the above mentioned minimal incubation times with these maximal incubation times are also contemplated, either including or excluding the respective endpoints. For instance, in some embodiments of the present invention the incubation time of the cooking step is about 65 min to about 250 min, or between about 65 min to about 250 min. Also contemplated in all of the above ranges are corresponding ranges in which the lower respective endpoint is included while the upper respective endpoint is excluded, as well as ranges in which the lower respective endpoint is excluded while the upper respective endpoint is included. The incubation time of the cooking step is suitable for producing a dissolving pulp that is itself suitable for use in the production of regenerated cellulose molded bodies, such as any one or more of lyocell, viscose or modal. The specific characteristics of such a dissolving pulp are described in detail in the present application, for example below in the section concerned with the dissolving pulp of the present invention.

The method of pulping of the present invention is characterized by the presence of a cellulose-stabilizing additive in the cooking step. This cellulose-stabilizing additive prevents degradation of cellulose during the pulping process, i.e. during the method of pulping of the present invention. The cellulose-stabilizing additive, in particular, prevents unwanted and uncontrollable cellulose degradation and therefore allows adjusting the pulping process to generate dissolving pulp with e.g. a specific intrinsic viscosity, viscose filter value and narrow MWD. In particular, the cellulose-stabilizing additive allows the control of cellulose degradation and therefore the intrinsic viscosity of the resulting dissolving pulp. The cellulose-stabilizing additive acts by interacting either directly with the cellulose molecule, or by scavenging, chelating, or binding other reagents that might otherwise cause cellulose degradation, such as transition metals, for instance, Fe, Cu, Mn, Co, Cr, Ni, and Zn. Transition metals are known to catalyze oxidative cellulose degradation. Thus, in some embodiments of the present invention, the cellulose-stabilizing additive is a transition metal complexing agent, chelator, scavenger or binding agent. Typical scavengers, chelators or binding agents contemplated in the context of the present invention are EDTA, DTPA, DTPMPA and NTA. In further embodiments of the present invention the cellulose-stabilizing additive is a magnesium salt, for instance, magnesium hydroxide or magnesium sulfate.

The cellulose-stabilizing additive is present in an amount (concentration) of about 0.01 to about 5.00% (w/w) of the cotton-based raw material. In some embodiments of the present invention the concentration of cellulose-stabilizing additive is at least about 0.05%, at least about 0.10%, at least about 0.20%, at least about 0.40%, at least about 0.50%, about 1.00%, about 1.50%, about 2.00%, about 2.50%, about 3.00%, about 3.50%, about 4.00%, or about 4.50%, all (w/w). The concentration of cellulose-stabilizing additive should, however, not exceed about 5.00% (w/w). Any range that is defined by the above-mentioned minimal concentrations and the maximal concentration of 5.00% (w/w) is also contemplated, including or excluding the respective endpoints. For instance, in some embodiments of the present invention the cellulose-stabilizing additive is present at about 1.00 to about 5.00% (w/w), or between about 1.00 to about 5.00% (w/w). A preferred concentration is about 0.10% (w/w). In some embodiments of the present invention the maximal concentration of cellulose-stabilizing additive may be about 4.50%, about 4.00%, about 3.50%, about 3.00%, about 2.50%, about 2.00%, about 1.5%, about 1.00%, or about 0.50%, all (w/w). Any range that is defined by these maximal concentrations of cellulose-stabilizing additive in combination with the above mentioned minimal concentrations of cellulose-stabilizing additive is also contemplated, either including or excluding the respective endpoints. For instance, in some embodiments of the present invention the cellulose-stabilizing additive is about 0.05 to about 1.00% (w/w), or between about 0.05 to about 1.00% (w/w). Also contemplated in all of the above ranges are corresponding ranges in which the lower respective endpoint is included while the upper respective endpoint is excluded, as well as ranges in which the lower respective endpoint is excluded while the upper respective endpoint is included. In general, the concentration of the cellulose-stabilizing additive is chosen in such a way that unwanted and uncontrollable degradation of the cellulose during the cooking step is prevented.

The alkaline solution used in the cooking step contains or comprises an alkali. The alkali is preferably potassium hydroxide, sodium hydroxide, sodium carbonate or any combination thereof, preferably sodium hydroxide. The concentration of alkali, in particular of potassium hydroxide, sodium hydroxide, sodium carbonate or any combination thereof, is about 1-about 35% (w/w) or between about 1-about 35% (w/w) of the cotton-based raw material. A concentration of alkali of about 30% (w/w) is particularly useful if the cotton-based raw material comprises polyester. In some embodiments of the present invention the concentration of alkali is at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, or at least about 34%, all (w/w). The concentration of alkali should not, however, exceed about 35% (w/w). Any range that is defined by the above-mentioned minimal concentrations and the maximal concentration of 35% (w/w) is also contemplated, either including or excluding the respective endpoints. For example, in some embodiments of the present invention the concentration of alkali is about 5% to about 35% (w/w), or between about 5% to about 35% (w/w). In some embodiments of the present invention, the maximal concentration of alkali may be about 34%, about 33%, about 32%, about 31%, about 30%, 29%, about 28%, about 27%, about 26%, about 25%, about 24%, about 23%, about 22%, about 21%, about 20%, about 19%, about 18%, about 17%, or about 16%, all (w/w). Any range that is defined by these maximal concentrations of alkali in combination with the above mentioned minimal concentrations of alkali is also contemplated, either including or excluding the respective endpoints. For instance, in some embodiments of the present invention the concentration of alkali is about 2% to about 20%, about 3% to about 19%, or about 4% to about 18%, all (w/w), or between about 2% to about 20%, between about 3% to about 19%, or between about 4% to about 18%, all (w/w), preferably the alkali is sodium hydroxide. Also contemplated in all of the above ranges are corresponding ranges in which the lower respective endpoint is included while the upper respective endpoint is excluded, as well as ranges in which the lower respective endpoint is excluded while the upper respective endpoint is included.

The pH of the alkaline solution ranges from about pH 7 to about pH 14, or from between about pH 7 to about pH 14. Preferably, the pH of the alkaline solution used in the cooking step is at least about pH 9, more preferably at least about pH 10. Alternatively, the pH of the alkaline solution may be at least about pH 7, at least about pH 8, at least about pH 11 or at least about pH 12. In some embodiments of the present invention the maximal pH value may be about pH 13, about pH 12, about pH 11, about pH 10, about pH 9, about pH 8, or about pH 7. Any range that is defined by the above-mentioned minimal or maximal pH values is also contemplated in the context of the present invention, either including or excluding the respective endpoints. For example, in some embodiments of the present invention the pH of the alkaline solution ranges from about pH 9 to about pH 13, or is between about pH 9 and about pH 13, or ranges from about pH 9 to about pH 12, or is between about pH 9 and about pH 12. Also contemplated in all of the above ranges are corresponding ranges in which the lower respective endpoint is included while the upper respective endpoint is excluded, as well as ranges in which the lower respective endpoint is excluded while the upper respective endpoint is included.

The method of pulping of the present invention is carried out at an initial gas pressure of about 1 bar (0.1 MPa) to 21 bar (2.1 MPa). In particular, the cooking step is carried out at an initial gas pressure of about 1 bar (0.1 MPa) to about 20 21 bar (2.0 1 MPa). In some embodiments of the present invention the initial gas pressure is at least about 1 bar (0.1 MPa), at least about 2 bar (0.2 MPa), at least about 3 bar (0.3 MPa), at least about 4 bar (0.4 MPa), at least about 5 bar (0.5 MPa), at least about 6 bar (0.6 MPa), at least about 7 bar (0.7 MPa), at least about 8 bar (0.8 MPa), at least about 9 bar (0.9 MPa), at least about 10 bar (1.0 MPa), at least about 11 bar (1.1 MPa), at least about 12 bar (1.2 MPa), at least about 13 bar (1.3 MPa), at least about 14 bar (1.4 MPa), at least about 15 bar (1.5 MPa), at least about 16 bar (1.6 MPa), at least about 17 bar (1.7 MPa), at least about 18 bar (1.8 MPa), at least about 19 bar (1.9 MPa), at least about 20 bar (2.0 MPa) or at least about 21 bar (2.1 MPa). The initial gas pressure should not exceed about 21 bar (2.1 MPa). All ranges that are defined by the above mentioned minimal initial gas pressures and the maximal initial gas pressure are also contemplated, either including or excluding the respective endpoints. For instance, in some embodiments of the present invention the initial gas pressure is about 3 bar (0.3 MPa) to about 21 bar (2.1 MPa), or between about 3 bar (0.3 MPa) to about 21 bar (2.1 MPa). In some embodiments of the present invention the maximal initial gas pressure may also be lower than about 21 bar (2.1 MPa), for instance, about 20 bar (2.0 MPa), about 19 bar (1.9 MPa), about 18 bar (1.8 MPa), about 17 bar (1.7 MPa), about 16 bar (1.6 MPa), about 15 bar (1.5 MPa), about 14 bar (1.4 MPa), about 13 bar (1.3 MPa), about 12 bar (1.2 MPa), about 11 bar (1.1 MPa), about 10 bar (1.0 MPa), about 9 bar (0.9 MPa), or about 8 bar (0.8 MPa). Any range that is defined by these maximal initial gas pressures and the above mentioned minimal initial gas pressures is also contemplated. For instance, in some embodiments of the present invention the initial gas pressure is about 2 bar (0.2 MPa) to about 10 bar (1.0 MPa), about 3 bar (0.3 MPa) to about 10 bar (1.0 MPa), or about 4 bar (0.4 MPa) to about 10 bar (1.0 MPa). Preferably the initial gas pressure is about 8 bar (0.8 MPa). Also contemplated in all of the above ranges are corresponding ranges in which the lower respective endpoint is included while the upper respective endpoint is excluded, as well as ranges in which the lower respective endpoint is excluded while the upper respective endpoint is included.

The gaseous oxidizing agent of the present invention is suitable for bleaching the cotton-based raw material of the present invention and increasing the ISO brightness of the cotton-based raw material. Further, the gaseous oxidizing agent is suitable to promote degradation of cellulose fibers and to control the intrinsic viscosity of the dissolving pulp. Some embodiments of the present invention the gaseous oxidizing agent is molecular oxygen ($O_2$). In other embodiments of the present invention the gaseous oxidizing agent is a gas that comprises or contains molecular oxygen ($O_2$), such as air.

The skilled person will understand that the reaction temperature of the cooking step, the incubation time of the cooking step, the concentration of alkali in the cooking step and the initial gas pressure of the gaseous oxidizing agent in the cooking step influence, for example, the intrinsic viscosity of the produced dissolving pulp. In particular, the higher the reaction temperature, the longer the incubation time, the higher the concentration of alkali or the higher the initial gas pressure of the gaseous oxidizing agent, the lower the intrinsic viscosity of the produce dissolving pulp will be, provided that all other respective parameters are kept constant. The skilled person will understand that an increase in one parameter, for example, an increase in temperature or reaction time, may be balanced with a decrease in one or more of the other parameters. For instance, an increase in reaction temperature may be balanced by concomitantly reducing the concentration of alkali, thereby keeping the intrinsic viscosity of the produced dissolving pulp at a constant level.

The skilled person will understand how to modify the different parameters of the present invention, for instance, the reaction temperature of the cooking step, the incubation time of the cooking step, the concentration of alkali in the cooking step, and the initial gas pressure of the cooking step, to achieve a desired intrinsic viscosity, in particular, an intrinsic viscosity within the range of about 200 mL/g to about 1500 mL/g.

The skilled person will also understand that the quality of the cotton-based raw material also has an influence on the intrinsic viscosity of the produced dissolving pulp. The above mentioned parameters of the cooking step can be tuned to accommodate a given cotton-based raw material to achieve a desired intrinsic viscosity. For instance, an increase of impurities in the cotton-based raw material, such as an increase in the amount of synthetic fibers in the cotton-based raw material, may necessitate an increase in one or more of the above mentioned parameters, for example, the concentration of alkali, to achieve a desired intrinsic viscosity of the produced dissolving pulp.

The presence of a cellulose-stabilizing additive allows tuning of the method of pulping of the present invention by adjusting one or more of the above mentioned parameters to achieve a dissolving pulp with a desired intrinsic viscosity in a flexible, while reproducible and predictable manner.

Dissolving Pulp

The dissolving pulp the present invention can be characterized by its high purity, its low content of hemicellulose, its intrinsic viscosity, its high ISO brightness, its advantageous viscose filter value (FV), its suitability for the production of regenerated cellulose molded bodies, such as any one or more of lyocell, viscose or modal, its low content of carbonyl groups, carboxyl groups or both, i.e. it is essentially free of carbonyl groups, carboxyl groups or both, its narrow MWD, or any combination thereof including all thereof.

The high purity of the dissolving pulp of the present invention means that the dissolving pulp of the present invention largely consists of or essentially consists of pure cellulose and only contains minor fractions of other molecules, which in the context of the present invention are considered impurities.

In particular the high purity of the dissolving pulp of the present invention means the following. The dissolving pulp of the present invention has a low content of hemicellulose, which is less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1%, all weight per weight relative to the total weight of the dissolving pulp (w/w). Particularly preferred is a dissolving pulp with less than about 10%, less than about 9%, less than about 8%, less than about 7%, less than about 6%, less than about 5%, less than about 4%, less than about 3%, less than about 2%, or less than about 1% of hemicellulose, all w/w. Most preferred is a dissolving pulp with less than about 5% or less than about 1% of hemicellulose, all w/w. Phrased differently, the cellulose content of the dissolving pulp of the present invention is preferably greater than about 90%, greater than about 91%, greater than about 92%, greater than about 93%, greater than about 94%, greater than about 95%, greater than about 96%, greater than about 97%, greater than about 98%, greater than about 99%, all weight per weight (w/w) relative to the total weight of the dissolving pulp. Particularly preferred contents of hemicellulose, or contents of cellulose, are those contents that are particularly suitable for producing regenerated cellulose molded bodies such as any one or more of lyocell, viscose or modal. In general, the lower the content of hemicelluloses, and the higher the content of cellulose, the better suited the dissolving pulp is for the production of regenerated cellulose molded bodies.

The dissolving pulp of the present invention has an intrinsic viscosity of about 200 to about 1900 mL per gram (mL/g), or an intrinsic viscosity between about 200 to about 1900 mL per gram (mL/g). Particularly preferred is an intrinsic viscosity of about 200 to about 1500 mL/g, or between about 200 to about 1500 mL/g. Particularly preferred lower endpoints of the intrinsic viscosity range are about 300, about 400, about 500, about 600, about 700 and about 800, all mL/g. Particularly preferred upper endpoints of the intrinsic viscosity range are about 1900, about 1800, about 1700, about 1600, about 1500, about 1400 and, about 1300, about 1200 and about 1100, all mL/g. Any of the above recited lower or upper endpoints of the intrinsic viscosity range may be combined with any of the other range end points. In particular, the ranges of about 300-about 1500 (or between about 300-about 1500), about 400-about 1500 (or between about 400-about 1500), about 500-1500 (or between about 500-about 1500), about 200-about 1400 (or between about 200-about 1400), about 200-about 1300 (or between about 200-about 1300), about 200-about 1200 (or between about 200-about 120), about 300-about 1400 (or between about 300-about 1400), about 400-about 1300 (or between about 400-about 1300) and about 500-about 1200 (or between about 500-about 1200), all mL/g, are preferred. Also contemplated in all of the above ranges are corresponding ranges in which the lower respective endpoint is included while the upper respective endpoint is excluded, as well as ranges in which the lower respective endpoint is excluded while the upper respective endpoint is included. Particularly preferred intrinsic viscosity ranges are those viscosity ranges that are particularly suitable for producing regenerated cellulose molded bodies such as any one or more of lyocell, viscose or modal. Typically, intrinsic viscosities below about 200 mL/g or above about 1500 mL/g are not suitable for producing regenerated cellulose molded bodies such as any one or more of lyocell, viscose or modal.

In the context of the present invention the intrinsic viscosity, also called limiting viscosity number (LVN) or Staudinger index, is measured in milliliters per gram (mL/g) according to the established international standard ISO 5351, first edition, Jun. 15, 2004, which is known to the skilled person and is incorporated by reference herein its entirety. Briefly, the international standard ISO 5351 specifies a method which yields a number that is an estimate of the intrinsic viscosity of dissolving pulp in a dilute cupriethylenediamine (CED) solution. A dilute CED solution of the intrinsic pulp is prepared and the efflux time of the prepared solution from a viscometer is measured.

The dissolving pulp of the present invention has an ISO brightness of at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99%. Particularly preferred is an ISO brightness of at least about 85%, at least about 90% or at least about 95%.

In the context of the present invention the ISO brightness, also referred to as the blue reflectance factor, is measured according to the established international standard ISO 2470-1, first edition, Jan. 10, 2009, which is known to the skilled person and incorporated by reference. In the context of the present invention the terms "ISO", "ISO brightness" and "brightness" are used interchangeably.

The dissolving pulp of the present invention has a viscose filter value (FV) of at least about 200, at least about 250, at least about 300, at least about 350, at least about 400 or at least about 450, at least about 500, at least about 550 or at least about 600. Particularly preferred is a viscose filter value of at least about 300. The viscose filter value (FV) does typically not exceed about 700, about 750, or about 800.

The viscose filter value (FV) is the most commonly used measure for determining the reactivity of dissolving pulp.

The higher the viscose filter value (FV) the higher the reactivity of the dissolving pulp, in particular in the lyocell and viscose process. The dissolving pulp of the present invention is characterized by having a high viscose filter value which renders the dissolving pulp particularly suitable for the lyocell and viscose process. A method for preparing a test viscose, necessary for determining the viscose filter value, and measuring its filterability, i.e., determining the viscose filter value, is described in Hüpfl J and Zauner J, *Prüfung von Chemiefaserzellstoffen an einer Viskose-Kleinstanlage*, Das Papier, 20, 3, 1966, 125-132 known to the skilled person and incorporated by reference. In the context of the present invention the viscose filter value (FV) is determined according to the above reference (Hüpfl J, 1966).

The dissolving pulp of the present invention has a narrow MWD. A narrow MWD tends to ensure beneficial homogenous reactions in producing regenerated cellulose molded bodies. For instance, typically the narrower the MWD is, the stronger will be the resulting regenerated cellulose fibers, provided that all other conditions are kept constant. In particular, dissolving pulp of a narrow MWD is beneficial for use of the dissolving pulp in the lyocell and viscose process. High and low molecular weight fractions could interfere with the lyocell, viscose or modal process and, for instance, could result in a final product with a weaker fiber structure. A narrow MWD in the context of the present invention means that a large fraction of the cellulose of the dissolving pulp lies within a narrow molecular weight range. In the context of the present invention the MWD is measured according to Schelosky N et al, *Molmassenverteilung cellulosischer Produkte mittels Größenausschlußchromatographie in DMAc/LiCl*, Das Papier, 12/99, 728-738, which is known to the skilled person and incorporated by reference. The width of the MWD is expressed in terms of the polydispersity index (PDI). A narrow MWD in the sense of the present invention means that the PDI is below about 2.5, below about 2.2, below about 2.0, below about 1.8, below about 1.6, below about 1.4, or below about 1.2. The skilled person will know that the smallest possible lower limit of the PDI is 1.0, at least theoretically. This is due to how the parameter PDI is calculated, as for example indicated in the above publication by Schelosky et al. In some embodiments of the present invention the lower limit of the PDI is about 1.8, about 1.6, about 1.4 or about 1.2. In some embodiments of the present invention the above recited term "below about" may also mean "is about equal to or below about". Any range that is defined by combining one of the above mentioned maximal PDI values and one of the above mentioned lower limits is also contemplated as part of the invention, for instance, the range from about 1.2 to about 1.8. Any range that is thus contemplated may include or exclude the endpoints (limits) defining the range. Also contemplated in all of the above ranges are corresponding ranges in which the lower respective endpoint is included while the upper respective endpoint is excluded, as well as ranges in which the lower respective endpoint is excluded while the upper respective endpoint is included.

The dissolving pulp of the present invention is further characterized by the low level, the absence, or essential absence of reactive chemical groups that interfere with downstream applications, such as the use of the dissolving pulp of the present invention in the preparation of regenerated cellulose molded bodies, such as any one or more of lyocell, viscose or modal molded bodies. In particular, it has been surprisingly found that the dissolving pulp of the present invention, and in particular the dissolving pulp produced by the method of pulping of the present invention, has or contains a reduced content of carbonyl groups or carboxyl groups or both, when compared to the dissolving pulp of the prior art, or is essentially free of carbonyl groups or carboxyl groups or both. In the context of the present invention a low level of chemical groups that interfere with downstream applications, in particular a low level of carbonyl groups or carboxyl groups or both means that the level of said groups is below about the level of said groups in dissolving pulp produced from pulpwood, in particular hardwood prehydrolysis Kraft pulp, dissolving pulp produced from cotton linters without the presence of a gaseous oxidizing agent and a cellulose-stabilizing additive in the cooking step, or both. Further embodiments of dissolving pulp with a low level of carbonyl groups or carboxyl groups or both are described herein below.

The presence of carbonyl groups in the context of the present invention is measured according to the method disclosed in Rohrling J, et al, *A Novel Method for the Determination of Carbonyl Groups in Cellulosics by Fluorescence Labeling. 1. Method Development*, Biomacromolecules, 2002, 3, 959-968; Rohrling J, et al, *A Novel Method for the Determination of Carbonyl Groups in Cellulosics by Fluorescence Labeling. 2. Validation and Applications*, Biomacromolecules, 2002, 3, 969-975; and Potthast A, et al, *A Novel Method for the Determination of Carbonyl Groups in Cellulosics by Fluorescence Labeling. 3. Monitoring Oxidative Processes*, Biomacromolecules, 2003, 4, 743-749, all known to the skilled person and incorporated by reference. The method disclosed in these documents and used in the context of the present invention is based on the use of carbazole-9-carboxylic acid [2-(2-aminooxyethoxy)ethoxy] amide (CCOA). Therefore the method is referred to as the "CCOA method".

The presence of carboxyl groups in the context of the present invention is measured according to the method disclosed in Bohm R, et al, *The FDAM Method: Determination of Carboxyl Profiles in Cellulosic Materials by Combining Group-Selective Fluorescence Labeling with GPC*, Biomacromolecules, 2006, 7, 1743-1750, known to the skilled person and incorporated by reference. The method disclosed in this document uses 9H-fluoren-2-yl-diazomethane (FDAM) and is therefore referred to as the "FDAM method".

In some embodiments of the present invention the dissolving pulp, in particular the dissolving pulp produced by the method of the present invention, contains a low level of carbonyl groups, carboxyl groups or carbonyl groups and carboxyl groups. In some embodiments of the present invention containing a low level of carbonyl groups, carboxyl groups or carbonyl groups and carboxyl groups means that the dissolving pulp is essentially free of carbonyl groups, carboxyl groups or carbonyl groups and carboxyl groups.

In some embodiments of the present invention containing a low level of carbonyl groups means that the dissolving pulp, in particular the dissolving pulp produced by the method of the present invention, contains an amount of carbonyl groups below about 1.00, about 0.90, about 0.80, about 0.70, about 0.60, about 0.50, about 0.40, about 0.30, or about 0.20, all with the units µmol carbonyl groups per g dissolving pulp (µmol/g). The term "below about" may also mean "about equal to or below about". Preferably the dissolving pulp contains an amount of carbonyl groups below about 0.60, about 0.50, about 0.40, about 0.30, or about 0.20, all µmol/g, more preferably below about 0.40 µmol/g.

In some embodiments of the present invention containing a low level of carboxyl groups means that the dissolving pulp, in particular the dissolving pulp produced by the method of the present invention, contains an amount of carboxyl groups below about 8.00, about 7.00, about 6.00, about 5.00, about 4.00, about 3.50, about 3.00, about 2.50, or about 2.00, all with the units μmol carboxyl groups per g dissolving pulp (μmol/g). The term "below about" may also mean "about equal to or below about". Preferably the dissolving pulp contains an amount of carboxyl groups below about 4.00 μmol/g.

Carbonyl and carboxyl groups interfere with the above indicated downstream applications of dissolving pulp, in particular the lyocell, viscose and modal process, i.e., the presence of carbonyl- and carboxyl groups in the dissolving pulp reduces the reactivity of the dissolving pulp in the lyocell, viscose and modal process. Carbonyl and carboxyl groups interfere with the above indicated downstream applications, for example, since these reactive groups constitute chemically reactive loci within cellulose which can react with nucleophilic substances involved in these processes, leading to degradative cleavage of the cellulose polymer. Such cleavage entails certain disadvantages. Under a given set of processing conditions, the occurrence of such cleavage reactions shortens the lengths of cellulose polymer present in the dissolving pulp, thereby decreasing its viscosity. Since the extent of such cleavage depends primarily on the amount of reactive groups within the cellulose in the dissolving pulp, and is thus largely out of the experimenter's control, such uncontrolled cleavage thus threatens to reduce the viscosity of the dissolving pulp below the minimum intrinsic viscosity needed to ensure the proper functioning of downstream processes, such as lyocell, viscose or modal processes to form regenerated cellulose molded bodies. In addition, the presence of carbonyl groups, carboxyl groups or both in the dissolving pulp promotes an undesirable discoloration, in particular yellowing of any regenerated cellulose molded bodies which are made from such dissolving pulp.

Reduction of the amount of reactive chemical groups such as carbonyl groups, carboxyl groups or both, for instance, to essentially zero, in the dissolving pulp thus effectively reduces, or removes, the source of an uncontrollable variable which otherwise threatens to preclude the use the dissolving pulp in downstream processes such as lyocell, viscose or modal processes. At the same time, such reduction avoids an undesirable discoloration over time which would otherwise threaten to decrease the value of any molded bodies formed in spite of the above difficulties. The methods of the present invention result in dissolving pulp which is essentially free of carbonyl groups, carboxyl groups or both, thereby avoiding the disadvantages described above, and providing dissolving pulp which is well suited for further processing to regenerated cellulose molded bodies which will satisfy the standards of appearance required in industry.

In some embodiments of the present invention the dissolving pulp is obtainable by the method of the present invention and contains an amount of carbonyl groups which is below about 0.40 μmol/g, contains an amount of carboxyl groups which is below 4.00 μmol/g, has an intrinsic viscosity of about 200-about 1500 mL/g, has an ISO brightness of at least about 80%, preferably at least about 85%, has a viscose filter value (FV) of at least about 200, preferably at least about 300, or any combination thereof. In a particularly preferred embodiment of the present invention the dissolving pulp is obtainable by the method of the present invention and contains an amount of carbonyl groups which is below about 0.40 μmol/g, contains an amount of carboxyl groups which is below 4.00 μmol/g, has an intrinsic viscosity of about 200-about 1500 mL/g, has an ISO brightness of at least about 80%, preferably at least about 85%, and has a viscose filter value (FV) of at least about 200, preferably at least about 300.

Methods of Producing Regenerated Cellulose Molded Bodies

Methods of producing regenerated cellulose molded bodies are already known to the skilled person. The lyocell process, in particular using aqueous amine oxide, especially preferred 4-methylmopholine N-oxide (NMMO) is for example disclosed in EP 0356419 B1 and EP 0584318 B1, both incorporated by reference herein in their entirety. The viscose process is for example disclosed in Gotze, Chemiefasern nach dem Viskoseverfahren, 1967, which is incorporated by reference herein in its entirety. The modal process is for example disclosed in patent AT 287905, which is incorporated by reference herein in its entirety.

EXAMPLES

Example 1: Method of Pulping Cotton Under Alkaline Conditions Without a Gaseous Oxidizing Agent (Reference)

Example 1 serves as a reference example, in which the pulping was conducted without the presence of a gaseous oxidizing agent and a cellulose-stabilizing additive. The pulping trial was conducted with chemically untreated, carded cotton lint fibers in a 5 liter batch digester. As a pre-treatment, fibers were cut in a cutting mill resulting in fiber lengths of 3-6 mm. For achieving a homogeneous mixture, fibers were stirred in the alkaline solution before filling the reaction mixture (comprising fibers plus alkaline solution) into the pressurized vessel (digester). After charging the digester with the reaction mixture, the reaction mixture was heated. The trial was carried out at 130° C. for 2.5 hours. The cooking liquor consisted of an aqueous solution of 11% (w/w) NaOH on cellulose.

The pulp obtained after cooking has a brightness of 80.2% ISO and an intrinsic viscosity of 1560 mL/g. The yield was calculated to be 91.7%.

Example 2: Method of Pulping Cotton Under Alkaline Conditions in the Presence of a Gaseous Oxidizing Agent and a Cellulose-Stabilizing Additive Example 2 demonstrates that pulping cotton lint fibers, which is a cotton-based raw material in the sense of the present invention, under alkaline conditions in the presence of oxygen and magnesium sulfate as a cellulose-stabilizing additive provides high quality dissolving pulp suitable for downstream use, as a starting material, in the production of regenerated cellulose molded bodies, such as any one or more of lyocell, modal, or viscose.

The cotton lint fibers (starting material), cooking parameters and pre-treatments used in Example 2 were the same as in Example 1.

In addition, magnesium sulfate ($MgSO_4$) was added to the cooking liquor in a concentration of 0.1% (w/w) on cellulose. Oxygen was chosen as gaseous oxidizing agent. The digester was set under 8 bar pressure.

The pulp obtained after cooking has a brightness of 91.0% ISO and an intrinsic viscosity of 755 mL/g. The yield was calculated to be 91.7%.

The results in Example 2 compared to Example 1 show an enormous increase in brightness and a significant decrease in intrinsic viscosity with constant yield. A decrease in intrinsic viscosity is particularly useful for downstream applications such as the lyocell, viscose or modal process. This is for example illustrated in Example 6, which shows that the dissolving pulp produced according to the method of Example 2 is particularly suited for the viscose process, since it has a very high filter value of 415 (see Example 6).

Example 3: Method of Pulping Cotton Fabric in the Presence of a Gaseous Oxidizing Agent and a Cellulose-Stabilizing Additive Example 3 extends the results obtained in Example 2 and demonstrates that not only cotton lint fibers but also cotton fabric can be used as a cotton-based raw material in the method of pulping according to the present invention. Cooking parameters, additives and pre-treatments used in Example 3 were the same as that for Example 2. The cooking trial was conducted with greige woven cotton fabric.

The pulp obtained after cooking has a brightness of 90.4% ISO and an intrinsic viscosity of 715 mL/g, yield was calculated to 91.4%.

The results in Example 3 agree with the results of Example 2 and demonstrate that a wide range of cotton-based raw materials may be used in the method of the present invention to obtain high quality dissolving pulp suitable for use in the production of regenerated cellulose molded bodies, such as lyocell, viscose or modal. The ISO brightness of the dissolving pulp of Example 3 by far exceeds the ISO brightness obtained in the reference example (Example 1). An increase in ISO brightness renders the dissolving pulp particularly suitable for producing regenerated cellulose molded bodies such as any one or more of lyocell, viscose, or modal. Further, the intrinsic viscosity of the dissolving pulp produced according to the method of Example 3 has been substantially decreased below the value of 1500 mL/g and is therefore particularly suited for the lyocell, viscose, or modal processes. In contrast, the intrinsic viscosity of the reference example (Example 1) is 1560 mL/g.

Example 4: Method of Pulping Cotton/Polyester Fabric in the Presence of a Gaseous Oxidizing Agent and a Cellulose-Stabilizing Additive Example 4 demonstrates that not only pure cotton-based raw materials but also blends of cotton and other synthetic fibers, such as polyester (PES), which largely consist of cotton, are suitable for the method of the present invention. Cooking parameters, additives and pre-treatments used in Example 4 were the same as that for Example 3. The cooking trial was conducted with cotton/PES fabric. PES content of the original fabric was measured 32.7%; corresponding to a cotton content of 67.3%.

The pulp obtained after cooking has a brightness of 93.1% ISO and an intrinsic viscosity of 740 mL/g, yield was calculated to 59.8%.

The results in Example 4 even show an increase in brightness compared to Example 3. Overall cellulose yield agrees with the results of Example 3 when taking the PES content into consideration for the purpose of yield calculation. Surprisingly, cotton-based raw materials including even substantial amounts of synthetic fibers, such as PES, can still be used as starting material in the method of pulping of the present invention. Such blends still yield dissolving pulp of high quality that is suitable for downstream use in the production of regenerated cellulose molded bodies such as any one or more of lyocell, viscose, or modal. In fact, the ISO brightness and the intrinsic viscosity of the dissolving pulp obtained from such a blend are absolutely comparable to the ISO brightness and intrinsic viscosity of pure cotton starting material, if not even better. Therefore, Example 4 demonstrates that the method of pulping of the present invention is also applicable to a wide variety of different starting materials, that is different cotton-based raw materials, which may include substantial amounts of non-cellulose components.

Example 5: Method of Pulping Cotton Fibers without a Gaseous Oxidizing Agent Followed by a Subsequent Oxygen Bleaching Step Example 5 shows that subsequent bleaching of pulp does not yield the same result as the method of pulping of the present invention. The cotton lint fibers, cooking parameters and pre-treatments used in Example 5 were the same as that for Example 1. The results of the pulping process agree with the results of Example 1.

Following the pulping step a harsh oxygen bleaching step was conducted. Bleaching conditions used in Example 5 were the same as the cooking conditions for Example 2. The pulp obtained after bleaching has a brightness of 86.8% ISO and an intrinsic viscosity of 1210 mL/g, bleaching loss was calculated to 0.5% leading to yield of 91.2% (pulping and bleaching).

Compared to the results in Example 2, the results in Example 5 show a lower value for brightness and yield and a higher value for intrinsic viscosity. In particular, the dissolving pulp generated in Example 5 has a viscosity filter value of only 50, which renders the dissolving pulp unsuitable for the viscose process (see Example 6).

Example 6: Application Test for Viscose (Viscose Filter Value, FV) According to Hüpfl J (1966)

The viscose filter value (FV) is an important parameter for determining the reactivity of dissolving pulp in the viscose process, which is an example of a process for the production of regenerated cellulose. The viscose filter values (FV) of all dissolving pulps obtained from Examples 1 to 5 were determined according to Hüpfl J (1966), to investigate the reactivity of the generated dissolving pulps in an exemplary downstream process for the production of regenerated cellulose molded bodies, in particular the viscose process.

TABLE 1

Viscose filter values (FV) of dissolving pulps obtained from Examples 1 to 5

| Example No. | Description | Filter value (FV) |
| --- | --- | --- |
| 1 | Pulping cotton without gaseous oxidizing agent | 120 |
| 2 | Pulping cotton with gaseous oxidizing agent | 415 |
| 3 | Pulping cotton fabric with gaseous oxidizing agent | 405 |

TABLE 1-continued

Viscose filter values (FV) of dissolving
pulps obtained from Examples 1 to 5

| Example No. | Description | Filter value (FV) |
|---|---|---|
| 4 | Pulping cotton/PES fabric with gaseous oxidizing agent | 390 |
| 5 | Pulping cotton without gaseous oxidizing agent with subsequent oxygen bleaching step | 50 |

The results shown in Table 1 demonstrate that the method of pulping according to the present invention, using alkaline conditions in the presence of a gaseous oxidizing agent and a cellulose-stabilizing additive (Examples 2, 3 and 4), produces a dissolving pulp with exceptional reactivity for producing regenerated cellulose molded bodies, such as viscose. In the absence of a gaseous oxidizing agent and a cellulose-stabilizing additive in the cooking step the viscose filter values (FV) of the resulting dissolving pulps are significantly lower, indicating a lower reactivity in the viscose process. In particular, also the dissolving pulp of Example 5, despite having a intrinsic viscosity of 1210 mL/g and an ISO brightness of 86.8%, has a filter value of only 50, which means that the dissolving pulp is essentially unsuitable for the viscose process. All results of application tests available for other molds of regenerated cellulose (e.g. lyocell) agree with the results shown in Example 6.

Example 7: Production of Lyocell from Dissolving Pulp of the Present Invention Example 7 shows that the dissolving pulp of the present invention is particularly suited for the production of lyocell. Cotton lint fibers as described in the above Examples 1 and 2 were subjected to a cooking trial at 150° C. for 1.5 hours. The cooking liquor consisted of an aqueous solution of 15% (w/w) NaOH on cellulose. Magnesium sulfate ($Mg(SO_4)$) was added to the cooking liquor to a concentration of 0.1% based on cellulose. Oxygen was chosen as the gaseous oxidizing agent and added to the digester at an initial gas pressure of 6 bar.

The pulp obtained after cooking has a brightness of 91.4% ISO and an intrinsic viscosity of 436 mL/g; yield was calculated to be 90.3%.

Starting from the pulp of the present invention, 1.3 dtex lyocell fibers with a tenacity of 40.0 cN/tex and an elongation of 9.3% were produced. 1 tex corresponds to 1 g/1000 m.

Example 8: Measuring the Carbonyl- and Carboxyl Content

It has been surprisingly found by the inventors that the dissolving pulp of the present invention has low levels of carbonyl groups, carboxyl groups or carbonyl groups and carboxyl groups. Example 8 shows a comparison of the amounts of carbonyl groups and carboxyl groups for untreated cotton lint fibers (sample 1), the dissolving pulp of the present invention (sample 2) and to reference examples of the prior art, namely a reference hardwood prehydrolysis Kraft pulp (sample 3), which is a pulp derived from pulpwood, and a reference cotton linters pulp (sample 4), which is disclosed in Röohrling J, et al, *A Novel Method for the Determination of Carbonyl Groups in Cellulosics by Fluorescence Labeling. 2. Validation and Applications*, Biomacromolecules, 2002, 3, 969-975, Table 1.

The amount of carbonyl groups was measured according to the CCOA method, the amount of carboxyl groups was measured according to the FDAM method.

As indicated in Table 2, the dissolving pulp of the present invention (sample 2) has a particularly low amount of carbonyl groups, which is about the detection limit of the CCOA method, which was used to determine the amount of carbonyl groups. In particular, the amount of carbonyl groups is significantly lower than the amount of carbonyl groups in a reference pulp that was also produced from cotton-based raw material, namely cotton linters (sample 4). Moreover, the amount of carbonyl groups in the dissolving pulp of the present invention is also drastically lower than the amount of carbonyl groups in a reference hardwood prehydrolysis Kraft pulp. In addition, the amount of carboxyl groups of the dissolving pulp of the present invention is also drastically lower than the amount of carboxyl groups in a reference hardwood prehydrolysis Kraft pulp. In this context one must bear in mind that the largest fraction of dissolving pulps is still produced from pulpwood, which as indicated by sample 3 have a high amount of carboxyl groups.

TABLE 2

Amounts of carbonyl groups and carboxyl groups

| Sample No. | Description | Carbonyl groups (µmol/g) | Carboxyl groups (µmol/g) |
|---|---|---|---|
| 1 | Untreated cotton lint fibers | 2.81 | 18.41 |
| 2 | Pulping cotton with gaseous oxidizing agent and adding cellulose stabilizing agent produced according to the invention | 0.37 | 3.97 |
| 3 | Reference hardwood prehydrolysis Kraft pulp. | 10.54 | 21.25 |
| 4 | Reference cotton linters pulp | 3.49 | Not determined |

As can be seen from the above, the method of the invention yields dissolving pulp having the advantage of greatly reduced amount of carbonyl and carboxyl groups as compared to conventional dissolving pulp not produced by the method of the invention.

What is claimed is:

1. A method of pulping a cotton-based raw material for producing dissolving pulp, said method comprising:
   a. an incubation step for generating the dissolving pulp by incubating the cotton-based raw material with an alkaline solution in combination with a gaseous oxidizing agent in a pressurized vessel
      i. at a temperature of about 90-about 185° C.,
      ii. for an incubation time of about 45-about 270 min,
      iii. in the presence of a cellulose-stabilizing additive,
      iv. at a concentration of alkali of about 1-about 35% (w/w) of the cotton-based raw material, and
      v. at an initial gas pressure of about 1-about 21 bar (about 0.1 MPa-about 2.1 MPa), thereby generating the dissolving pulp; and
   b. a step of washing the dissolving pulp,
   wherein the cotton-based raw material is a pre- or post-consumer material,
   wherein step a. is the only step for generating the dissolving pulp.

2. The method of claim 1, wherein the alkaline solution is a solution of potassium hydroxide, sodium hydroxide, sodium carbonate or a combination thereof.

3. The method of claim 2, wherein the alkaline solution is a solution of sodium hydroxide.

4. The method of claim 1, wherein the gaseous oxidizing agent is or comprises oxygen ($O_2$).

5. The method of claim 1, wherein the cellulose-stabilizing additive is a magnesium salt.

6. The method of claim 5, wherein the cellulose-stabilizing additive is magnesium sulfate.

7. The method of claim 1, wherein the cellulose-stabilizing additive is a transition metal chelator.

8. The method of claim 7, wherein the cellulose-stabilizing additive is EDTA, DTPA, NTA, DTPMPA or any combination thereof.

9. The method of claim 1, wherein the concentration of the cellulose-stabilizing additive is about 0.01-about 5.00% (w/w) of the cotton-based raw material.

10. The method of claim 1, wherein step (a) is preceded by a step of mechanically disintegrating the cotton-based raw material.

11. The method of claim 1, wherein the temperature is about 100-about 150° C., the incubation time is about 90-about 150 min, the concentration of alkali is about 4-about 20% (w/w) of the cotton-based raw material, the initial gas pressure is about 2-about 10 bar (about 0.2 MPa-about 1.0 MPa), the concentration of the cellulose-stabilizing additive is about 0.05-about 2.00% (w/w) of the cotton-based raw material, or any combination thereof.

12. The method of claim 1, wherein the concentration of alkali is sufficient to obtain a pH of at least about pH 9.

13. The method of claim 1, wherein the dissolving pulp comprises a level of carbonyl groups, carboxyl groups or carbonyl and carboxyl groups.

14. The method of claim 13, wherein the level of carbonyl groups is below about 0.40 μmol/g and/or the level of carboxyl groups is below about 4.00 μmol/g.

* * * * *